(12) United States Patent
Han et al.

(10) Patent No.: US 8,901,230 B2
(45) Date of Patent: Dec. 2, 2014

(54) MODIFIED GEOPOLYMER COMPOSITIONS, PROCESSES AND USES

(75) Inventors: Chan Han, Midland, MI (US);
Aleksander J. Pyzik, Midland, MI (US);
Jia Liu, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 1093 days.

(21) Appl. No.: 12/783,049

(22) Filed: May 19, 2010

(65) Prior Publication Data

US 2010/0304165 A1 Dec. 2, 2010

Related U.S. Application Data

(60) Provisional application No. 61/181,870, filed on May 28, 2009.

(51) Int. Cl.

| | |
|---|---|
| *B32B 27/32* | (2006.01) |
| *B05D 3/10* | (2006.01) |
| *C08K 3/34* | (2006.01) |
| *C09D 1/00* | (2006.01) |
| *C04B 20/10* | (2006.01) |
| *C04B 28/00* | (2006.01) |
| *C09D 1/04* | (2006.01) |

(52) U.S. Cl.
CPC .. *C09D 1/00* (2013.01); *C09D 1/04* (2013.01); *C04B 20/1074* (2013.01); *C04B 28/006* (2013.01)
USPC .......................................... 524/502; 524/450

(58) Field of Classification Search
CPC .... C04B 20/1074; C04B 28/006; C09D 1/00; C09D 1/04
USPC .................................. 524/450, 502
See application file for complete search history.

(56) References Cited

U.S. PATENT DOCUMENTS

| | | |
|---|---|---|
| 4,110,293 A | 8/1978 | Sandstrom |
| 4,349,386 A | 9/1982 | Davidovits |
| 5,244,726 A * | 9/1993 | Laney et al. ............... 428/312.6 |
| 5,925,449 A | 7/1999 | Davidovits |
| 6,992,027 B1 | 1/2006 | Buckingham et al. |
| 2004/0182285 A1 | 9/2004 | Mazany et al. |
| 2005/0172860 A1 | 8/2005 | Davidovits et al. |
| 2006/0251909 A1 | 11/2006 | Beall et al. |
| 2007/0144407 A1 | 6/2007 | Biscan et al. |
| 2007/0275241 A1 | 11/2007 | Sagoecrentsil et al. |
| 2008/0206575 A1 | 8/2008 | Ronk et al. |

FOREIGN PATENT DOCUMENTS

| | | |
|---|---|---|
| EP | 2071003 A1 | 6/2009 |
| JP | 10139523 A | 5/1998 |
| JP | 2003119386 | 4/2003 |
| WO | 0006633 A1 | 2/2000 |
| WO | 2004076378 A1 | 9/2004 |
| WO | 2007109862 A1 | 10/2007 |
| WO | 2008017413 | 2/2008 |
| WO | 2008113609 A2 | 9/2008 |

OTHER PUBLICATIONS

Allouche et al., "A new generation of cementitious materials for mortar lining of buried pipes", 2007, pp. 981-989, American Society of Civil Engineers.

Hajimohammadi et al., "One-Part Geopolymer Mixes from Geothermal Silica and Sodium Aluminate", Industrial & Engineering Chemistry Research, 2008, vol. 47, No. 23, pp. 9396-9405, American Chemical Society.

Hardjito et al., "Factors Influencing the compressive strength of fly ash-based geopolymer concrete", Civil Engineering Dimension, 2004, vol. 6, No. 2, pp. 88-93, Internet Citation, Thomson Gale.

Singh et al., "Geopolymer formation processes at room temperature studied by <29>Si and <27>Al MAS-NMR", Materials Science and Engineering A: Structural Materials: Properties, Microstructure & Processing, 2005, vol. 396, No. 1-2, pp. 392-402, Elsevier.

Temuujin et al., "Preparation of metakaolin based geopolymer coatings on metal substrates as thermal barriers", Applied Clay Science, 2009, vol. 46, pp. 265-270, Elsevier.

Yong et al., "Chemical characterisation of the steel-geopolymeric gel interface", Colloids and Surfaces. A, Physicaohemical and Engineering Aspects, 2007, vol. 302, No. 1-3, pp. 411-423, Elsevier.

Balaguru, Dr. P., "Geopolymer for Protective Coating of Transportation Infrastructures", Center for Advanced Infrastructure and Transportation (CAIT), Final Report, Report No. FHWA NJ, Dec. 1998, Rutgers, The State University, Piscataway, New Jersey, 29 Pages.

\* cited by examiner

*Primary Examiner* — Angela C Scott
(74) *Attorney, Agent, or Firm* — Andrew E. C. Merriam; Bradley W. Crawford

(57) ABSTRACT

The present invention relates to modified geopolymer compositions, geopolymer-coated organic polymer substrates, and methods of manufacturing and articles comprising same.

9 Claims, No Drawings

MODIFIED GEOPOLYMER COMPOSITIONS, PROCESSES AND USES

CROSS-REFERENCE TO RELATED APPLICATIONS

This application claims benefit from U.S. Provisional Patent Application No. 61/181,870, filed May 28, 2009, the entire contents of which are hereby incorporated herein by reference.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to modified geopolymer compositions, geopolymer-coated organic polymer substrates, and methods of manufacturing and articles comprising same.

2. Description of Related Art

Geopolymer materials have been used in construction (e.g., to make bricks) for centuries. Geopolymer compositions contain elements that include hydrogen, aluminum, silicon, oxygen, and a metal of Group 1 of the Periodic Table of the Elements.

Recently, Belaguru mentions, among other things, geopolymer compositions useful for coating surfaces of concrete, steel, or wood (Belaguru P., *Geopolymer for Protective Coating of Transportation Infrastructures, FINAL REPORT*, Report Number FHWA NJ 1998-12, 1998, Rutgers, The State University, Piscataway, N.J.). There Belaguru also mentions some compositions that comprise or are prepared with, among other things, an unspecified polymer latex. The exemplified polymer latex-containing compositions of Belaguru (see Composition 1 and Sample ID 28 to 36 in Table 1) comprise, among other things, "potassium silicate" ($K_2SiO_3$), a "silica fume" ("$SiO_2$"), and "ground sand," but do not seem to contain an ingredient that functions as a significant source of aluminum (e.g., as in aluminum oxides characteristic of geopolymer). Thus, the polymer latex-containing compositions of Belaguru do not seem to comprise geopolymer.

WO 2008/017413 A1 mentions pumpable geopolymer formulation and application for carbon dioxide storage.

There is a need in the art for modified geopolymer compositions useful for coating organic polymer substrates, geopolymer-coated organic polymer substrates, and methods of manufacturing the same.

BRIEF SUMMARY OF THE INVENTION

In a first embodiment, the present invention provides a modified geopolymer composition that comprises either (i) a stabilized geopolymer-organic polymer latex composition comprising a mixture of a geopolymer and an organic polymer latex; or (ii) a highly organic polymer-adherent capable, modified geopolymer composition. In some embodiments the modified geopolymer composition comprises the stabilized geopolymer-organic polymer latex composition, preferably wherein the mixture is essentially uniform. In some embodiments the stabilized geopolymer-organic polymer latex composition comprises the highly organic polymer-adherent capable, modified geopolymer composition. In some embodiments, the modified geopolymer composition does not contain a calcium based oxide. As used herein, the term "highly organic polymer-adherent capable" means characterizable as being able, after being cured and dried, to bond to a coating-ready surface of an organic polymer substrate (e.g., a surface of an extruded polystyrene foam substrate) with a bond strength of 50 kilopascals (kPa) or greater. A preferred method for measuring the bond strength is a tensile pull test method, which is described later. In some embodiments the stabilized geopolymer-organic polymer latex composition comprises, or is formed by combining, a first mixture of a hydrated polysialate and from 1.0 weight percent to 50 weight percent of an organic polymer latex; weight percent of the organic polymer latex being based on total weight of the first mixture. In some embodiments, the organic polymer latex, which is used to form the first mixture, comprises an organic polymer latex powder (i.e., the organic polymer latex powder is not water borne). In other embodiments, the organic polymer latex, which is used to form the first mixture, comprises a second mixture that comprises a water-borne organic polymer latex and from 0.05 weight percent to 10 weight percent of a latex stabilizer, weight percent of the latex stabilizer being based on total weight of the second mixture Preferably, the highly organic polymer-adherent capable, modified geopolymer composition is a water concentration- and silicon/aluminum (Si/Al) molar ratio-modified geopolymer composition, the water concentration- and Si/Al molar ratio-modified geopolymer composition having less than 36.0 weight percent of water based on total weight of the water concentration- and Si/Al molar ratio-modified geopolymer and a Si/Al molar ratio of greater than or equal to 1.70. More preferably, the Si/Al molar ratio is greater than or equal to 1.70 and less than or equal to 3.0.

In a second embodiment, the present invention provides a method of preparing a geopolymer-coated organic polymer substrate comprising a dried modified geopolymer layer in adhering operative contact with an organic polymer substrate, the adhering operative contact being characterizable as having a bond strength of 25 kilopascals (kPa) or greater as measured according to the tensile pull test method, the method comprising forming the geopolymer-coated organic polymer substrate as a function of drying a modified geopolymer precursor layer, the modified geopolymer precursor layer being in contact with the organic polymer substrate.

In some embodiments, the method of the second embodiment further comprises a preliminary step of curing the precursor modified geopolymer layer to give a cured modified geopolymer precursor layer. More preferably, the curing step is essentially simultaneous with, or still more preferably, at least partially precedes (i.e., some curing occurs before drying) or substantially precedes (most or all curing occurs before drying), the drying step. In some embodiments the curing substantially precedes the drying. In some embodiments, the modified geopolymer precursor layer comprises the cured modified geopolymer precursor layer. Still more preferably, the method of the second embodiment comprises steps of: (a) providing the organic polymer substrate, the organic polymer substrate having a coating-ready surface; (b)

contacting one of the modified geopolymer compositions of the first embodiment to the coating-ready surface, or a portion thereof, of the organic polymer substrate to give the modified geopolymer precursor layer in physical contact with the coating-ready surface, or the portion thereof, of the organic polymer substrate; (c) curing the modified geopolymer precursor layer to give the cured modified geopolymer precursor layer; and (d) drying the cured modified geopolymer precursor layer so as to remove at least 25 weight percent of water therefrom to give the geopolymer-coated organic polymer substrate.

In the second embodiment, the (cured) modified geopolymer precursor layers independently are in physical contact with the coating-ready surface, or the portion thereof, of the organic polymer substrate. In some embodiments, the cured and dried modified geopolymer layer, cured modified geopolymer precursor layer, and modified geopolymer precursor layer respectively comprise a cured and dried, highly organic polymer-adherent capable, modified geopolymer composition layer; a cured highly organic polymer-adherent capable, modified geopolymer composition precursor layer; and a highly organic polymer-adherent capable, modified geopolymer composition precursor layer. The highly organic polymer-adherent capable, modified geopolymer composition precursor layer is formed from the highly organic polymer-adherent capable, modified geopolymer composition of the first embodiment.

In some embodiments, the cured and dried modified geopolymer layer, cured modified geopolymer precursor layer, and modified geopolymer precursor layer respectively comprise a cured and dried, geopolymer-organic polymer latex layer; a cured geopolymer-organic polymer latex precursor layer; and a geopolymer-organic polymer latex precursor layer. The geopolymer-organic polymer latex precursor layer is formed from the stabilized geopolymer-organic polymer latex composition of the first embodiment. In embodiments of the method of the second embodiment that employ the cured geopolymer-organic polymer latex precursor layer, the organic polymer latex is characterizable as having a glass transition temperature and the drying step is characterizable as having a drying temperature, the drying temperature of the drying step being greater than the glass transition temperature of the organic polymer latex.

In a third embodiment, the present invention provides a geopolymer-coated organic polymer substrate comprising a dried modified geopolymer layer in adhering operative contact with a coating-ready surface, or portion thereof, of an organic polymer substrate, the adhering operative contact being characterizable as having a bond strength of 25 kilopascals (kPa) or greater as measured according to the tensile pull test method. Preferably the geopolymer-coated organic polymer substrate is prepared by the method of the second embodiment.

The invention geopolymer-coated organic polymer substrates are useful, for example, in applications and articles where it is desirable for the geopolymer-coated organic polymer substrate to have an enhanced aesthetic appearance or, preferably, improved flame-, heat-, light-, mechanical-, or chemical-resistance property, or a combination of two or more properties thereof, compared to such respective aesthetic appearance, property or properties of the uncoated organic polymer substrate. The dried modified geopolymer layer, including such layer prepared by the method of the second embodiment, provides said resistance properties to the organic polymer substrate to which it is adhered or bonded in the geopolymer-coated organic polymer substrate. Thus the invention geopolymer-coated organic polymer substrates are useful for preparing articles such as, for example, automotive components such as, for example, automotive hoses; building components such as, for example, external and internal building cladding (e.g., an exterior insulation and finishing system); outdoor articles such as, for example, outdoor furniture and signage; and lined infrastructure components such as, for example, lined industrial piping (e.g., lined sewer, water, and chemical process piping). The geopolymer articles also comprise housings such as, for example, electronic device and battery housings.

The invention modified geopolymer composition is capable of coating a coating-ready surface of an organic polymer substrate and, after curing and drying (e.g., hardening and removing a substantial amount of the water from the modified geopolymer composition), forming an adherent, preferably highly adherent, coating layer on the coating ready surface of the organic polymer substrate. In contrast to the invention modified geopolymer compositions, non-invention compositions consisting of unmodified geopolymer or non-invention modified geopolymer, after curing and drying, do not adhere, or adhere weakly (e.g., with a bond strength of less than 22 kPa, in some cases less than 11 kPa, when measured by the tensile pull test method described later) to coating-ready surfaces of organic polymer substrates.

Additional embodiments are described in the remainder of the specification, including the claims.

DETAILED DESCRIPTION OF THE INVENTION

The embodiments of the present invention described previously are incorporated by reference here. Those embodiments and the additional embodiments described later are further illustrated with reference to the following information.

For purposes of United States patent practice and other patent practices allowing incorporation of subject matter by reference, the entire contents—unless otherwise indicated—of each U.S. patent, U.S. patent application, U.S. patent application publication, PCT international patent application and WO publication equivalent thereof, referenced in the instant Detailed Description of the Invention are hereby incorporated by reference. In an event where there is a conflict between what is written in the present specification and what is written in a patent, patent application, or patent application publication, or a portion thereof that is incorporated by reference, what is written in the present specification controls.

In the present application, any lower limit of a range of numbers, or any preferred lower limit of the range, may be combined with any upper limit of the range, or any preferred upper limit of the range, to define a preferred aspect or embodiment of the range. Each range of numbers includes all numbers, both rational and irrational numbers, subsumed within that range (e.g., the range from about 1 to about 5 includes, for example, 1, 1.5, 2, 2.75, 3, 3.80, 4, and 5).

In an event where there is a conflict between a compound name and its structure, the structure controls.

In an event where there is a conflict between a unit value that is recited without parentheses, e.g., 2 inches, and a corresponding unit value that is parenthetically recited, e.g., (5 centimeters), the unit value recited without parentheses controls.

As used herein, "a," "an," "the," "at least one," and "one or more" are used interchangeably. In any aspect or embodiment of the instant invention described herein, the term "about" in a phrase referring to a numerical value may be deleted from the phrase to give another aspect or embodiment of the instant invention. In the former aspects or embodiments employing the term "about," preferably it means from 90 percent to 100 percent of the numerical value, from 100 percent to 110 percent of the numerical value, or from 90 percent to 110 percent of the numerical value. In any aspect or embodiment of the instant invention described herein, the open-ended terms "comprising," "comprises," and the like (which are synonymous with "including," "having," and "characterized by") may be replaced by the respective partially closed phrases "consisting essentially of," consists essentially of," and the like or the respective closed phrases "consisting of," "consists of," and the like to give another aspect or embodiment of the instant invention. In the present application, when referring to a preceding list of elements (e.g., ingredients), the phrases "mixture thereof," "combination thereof," and the like mean any two or more, including all, of the listed elements. The term "or" used in a listing of members, unless stated otherwise, refers to the listed members individually as well as in any combination, and supports additional embodiments reciting any one of the individual members (e.g., in an embodiment reciting the phrase "10 percent or more," the "or" supports another embodiment reciting "10 percent" and still another embodiment reciting "more than 10 percent."). The term "plurality" means two or more, each plurality being independently selected unless indicated otherwise. As used herein, "weight percent" and "wt %" are synonymous and are calculated for a component of a mixture based on total weight of the mixture unless indicated otherwise.

The term "layer" means a coating or film of a material. The term "coating-ready surface" means an area exposed to and prepared to receive a material for coating thereof.

The "glass transition temperature" ($T_g$) is determined by differential scanning calorimetry using a differential scanning calorimeter according to the method of ASTM E1356-03.

A mixture "comprising, or formed by combining" means a blend of or a material derived (e.g., chemically) from, or both.

Unless otherwise noted, the phrase "Periodic Table of the Elements" refers to the official periodic table, version dated Jun. 22, 2007, published by the International Union of Pure and Applied Chemistry (IUPAC). Also any references to a Group or Groups shall be to the Group or Groups reflected in this Periodic Table of the Elements.

The term "geopolymer" means a three-dimensional inorganic aluminosilicates mineral polymer that comprises a hydrated polysialate. Preferably, the hydrated polysialate is of empirical formula (G):

$$(M)_y[-(-SiO_2)_z-AlO_2)]_x \cdot wH_2O \quad (G),$$

wherein each M independently is a cation of Group 1 of the Periodic Table of the Elements; x is an integer of 2 or higher and represents a number of polysialate repeat units; y is an integer selected so that a ratio of y to x is greater than zero (y/x>0), preferably from greater than zero to less than or equal to 1 (0<y/x≤1); z is a rational or irrational number of from 1 to 35; and w is a rational or irrational number such that ratio of w to x (w/x) represents a ratio of moles of water per polysialate repeat unit. The z represents a molar ratio equal to moles of silicon atoms to moles of aluminum atoms (Si/Al) in the polysialate. The distribution of the $SiO_2$ functional groups in the invention geopolymer composition may be characterizable as being random. Thus, z can be a rational or irrational number.

In the hydrated polysialate of empirical formula (G), the w is preferably chosen to give a "geopolymer viscosity effective amount" of water, which means a quantity of water sufficient to a establish a desired resistance to flow for the stabilized geopolymer-organic polymer latex composition of the first embodiment such that the method of the second embodiment can be accomplished. More preferably, w is a rational or irrational number of from about 4 to about 8, more preferably from 4 to about 7.5. To give a desired geopolymer viscosity effective amount of water in the stabilized geopolymer-organic polymer latex composition, the w can be adjusted higher or lower by adding water to or removing (such as by drying) some water from the stabilized geopolymer-organic polymer latex composition.

In the hydrated polysialate of empirical formula (G), preferably each M independently is a cation of one or more metals of Group 1 of the Periodic Table of the Elements. Most common cations comprise potassium cation ($K^+$), sodium cation ($Na^+$), lithium cation ($Li^+$), or a combination of two or more thereof. In some embodiments, the cations may further comprise cations of one or more metals of Group 2 of the Periodic Table of the Elements, more preferably magnesium cation ($Mg^{+2}$), and still more preferably calcium cation ($Ca^{+2}$). In such embodiments, preferably the calcium cation does not comprise, and is not derived from, a calcium oxide. Preferably, at least 51 mol %, more preferably at least 90 mol %, still more preferably at least 98 mol %, and even more preferably at least 99 mol % of M are $Na^+$.

In the hydrated polysialate of empirical formula (G), preferably z is a rational or irrational number of from 1 to 3. In some embodiments, z is between 2 and 3 or, preferably, between 1 and 2. Preferably, z is 1.70 or greater and, more preferably, 1.9 or greater. Preferably, z is 3.0 or less. In some embodiments, z is 2.0 or less. In some embodiments, the hydrated polysialate of formula (G) comprises a poly(sialate) (z is 1 in empirical formula (G)), poly(sialate-siloxo) (z is 2 in empirical formula (G)), or poly(sialate-disiloxo) (z is 3 empirical formula (G)). Before any curing, the poly(sialate), poly(sialate-siloxo), and poly(sialate-disiloxo) each comprises a network of negatively charged tetrahedral silicon tetroxides (formally $SiO_4$) and tetrahedral aluminum tetroxides (formally $AlO_4$) linked by shared oxygen atoms thereof, cations such that the overall charge of the aluminosilicates mineral polymer is neutral, and water. The network of $SiO_4$ and $AlO_4$ tetrahedra defines structural cavities containing the cations M.

In some embodiments the invention modified geopolymer composition is a highly organic polymer-adherent capable, modified geopolymer composition, the highly organic polymer-adherent capable meaning that the highly organic polymer-adherent capable, modified geopolymer composition, after being cured and dried in contact with a coating-ready surface of an organic polymer substrate, would produce a highly organic polymer-adherent cured and dried modified geopolymer layer on the coating-ready surface of the organic polymer substrate, the highly organic polymer-adherent cured and dried modified geopolymer layer being characterizable as adhering to the coating-ready surface, or portion thereof, of the organic polymer substrate with a bond strength of 50.0 kilopascals (kPa) or greater, wherein the highly organic polymer-adherent capable, modified geopolymer composition is a water concentration- and Si/Al molar ratio-modified geopolymer composition, the water concentration- and Si/Al molar ratio-modified geopolymer composition having less than 36.0 weight percent of water based on total weight of the water concentration- and Si/Al molar ratio-modified geopolymer; and the water concentration- and Si/Al molar ratio-modified geopolymer composition comprising a hydrated polysialate of empirical formula (G): $(M)_y[-(-SiO_2)_z-AlO_2)]_x \cdot w\,H_2O$ (G), wherein each M independently is a cation of Group 1 of the Periodic Table of the Elements; x is an integer of 2 or higher and represents a number of polysialate repeat units; y is an integer selected so that a ratio of y to x is greater than zero (y/x>0); z being the silicon/ aluminum molar ratio and is a rational or irrational number; and w is a rational or irrational number such that ratio of w to x represents a ratio of moles of water per polysialate repeat unit, wherein either (a) z is from 1.70 to 3 or (b) z is from 1.9 to 3. Still more preferably z is from 1.70 to 3. Even more preferably z is from 1.9 to 3, and yet more preferably z is from 1.9 to 3 and the water concentration- and Si/Al molar ratio-modified geopolymer composition having less than 34.0 weight percent of water based on total weight of the water concentration- and Si/Al molar ratio-modified geopolymer.

Examples of hydrated polysialates include, but are not limited to, the hydrated poly(sialate), hydrated poly(sialate-siloxo), and hydrated poly(sialate-disiloxo) that have the following respective empirical formulas (M-PS), (M-PSS), and (M-PSDS):

Poly(sialate): $(M)_y\text{-}(\text{—Si—O—Al—O—})_x \cdot w\ H_2O$ (M-PS), wherein molar ratio of Si to Al is 1:1 (z=1);

Poly(sialate-siloxo): $(M)_y\text{-}(\text{Si—O—Al—O—Si—O—})_x \cdot w\ H_2O$ (M-PSS), wherein molar ratio of Si to Al is 2:1 (z=2); and Poly(sialate-disiloxo): $(M)_y\text{-}(\text{Si—O—Al—O—Si—O—Si—O—})_x \cdot w\ H_2O$ (M-PSS), wherein molar ratio of Si to Al is 3:1 (z=3);

wherein x, y, w, and M independently are as defined for empirical formula (G).

In some embodiments, the first mixture of the stabilized geopolymer-organic polymer latex composition or the highly organic polymer-adherent capable, modified geopolymer composition, both being modified geopolymer compositions of the first embodiment, comprises a first composite comprising, or formed by combining, two or more hydrated polysialates, each hydrated polysialate of the composite independently being of empirical formula (G) as described herein, the two or more hydrated polysialates, taken together, being characterizable with the empirical formula (G) and independently having an average value for each of the x, y, and z, the average values independently being rational or irrational numbers. In some embodiments, the modified geopolymer composition of the first embodiment comprises a second composite comprising, or formed by combining, the modified geopolymer composition of (i) and the modified geopolymer composition of (ii), both of the first embodiment. In some embodiments, the first or second composite, or both, do not contain a calcium based oxide.

Unmodified geopolymer compositions useful for preparing the modified geopolymer compositions of the present invention typically can be prepared by chemical dissolution and subsequent recondensation of various aluminosilicates oxides and silicates in the presence of hydroxide anions $(O(H)^-)$. In some embodiments, prepare an aqueous sodium silicate mixture (e.g., a sodium silicate solution) by combining water, sodium hydroxide, and a fumed silica. Combine the aqueous sodium silicate mixture with a source of aluminum oxides (e.g., a calcined kaolin clay) to give an unmodified geopolymer composition. For example, prepare a predetermined sodium silicate solution by combining predetermined amounts of water, sodium hydroxide and fumed silica to give the predetermined sodium silicate solution formally containing 72 weight percent (wt %) water, 10 wt % sodium hydroxide, and 18 wt % fumed silica. Combine the predetermined sodium silicate solution with a predetermined amount of calcined kaolin clay to give an unmodified geopolymer composition formally containing 29 wt % calcined kaolin clay and 71 wt % of the sodium silicate solution. Preferably, the modified geopolymer compositions of the present invention comprise, or are prepared from, the aqueous sodium silicate mixture.

Organic polymers useful as the organic polymer latexes, organic polymer substrates, or both can be natural or synthetic organic polymers. The term "organic polymer" means a macromolecule comprising carbon and hydrogen, the macromolecule comprising a plurality of repeat units, each repeat unit comprising a residual formed from a monomer, each monomer being the same as or different than another monomer. Where the monomers that formed the residuals of the macromolecule are all the same, the residuals can be the same or different from each other (e.g., terminal residuals being different from interior residuals; post-polymerization modified residuals being different from unmodified residuals; or both). Examples of suitable monomers are hydrocarbon monomers (i.e., monomers that consist of carbon and hydrogen) and heteroatom-containing monomers (i.e., monomers comprising carbon, hydrogen, and at least one heteroatom, each heteroatom preferably being an oxygen, nitrogen, fluoro, chloro). Examples of suitable hydrocarbon monomers are ethylene, propylene, a $(C_4\text{-}C_8)$alpha-olefin, 1,4-butadiene, and styrene. Examples of suitable heteroatom-containing monomers are a mixture of adipic acid and ethylenediamine, terephthalic acid and 1,4-butanediol, 4-hydroxybenzoic acid, acrylic acid, and lactic acid. Monomers that are dicarboxylic acid derivatives such as, for example, dimethyl dicarboxylic esters, dicarboxylic anhydrides (including cyclic and mixed carboxylic acid anhydrides), and dicarboxylic acid dichlorides (i.e., dicarboxoyl dichlorides) can be substituted for dicarboxylic acid monomers.

Examples of organic polymers useful in the present invention thus are natural rubber, polyethylene, polypropylene, a $(C_4\text{-}C_8)$alpha-olefin, poly(butadiene), and copolymerized mixtures thereof; polystyrenes; polycarbonates; polyesters, including polyethylene terephthalate, polylactic acid, and polybutylene terephthalate; polyacrylates; polymethacrylates; and interpolymers (e.g., copolymers) of any two or more of the monomers employed in the manufacture of the foregoing organic polymers. Unless otherwise noted, as used herein the term "butadiene" means 1,3-butadiene.

Preferably, the organic polymer substrate useful in the present invention comprises one or more of the example organic polymers mentioned in the immediately preceding paragraph. The aforementioned example organic polymers are also useful in latex forms as the organic polymer latexes, although the organic polymer latexes are not limited thereto.

Organic polymer latexes comprise natural organic polymer latexes (e.g., produced from *hevea brasilienesis* rubber tree) or, preferably, synthetic organic polymer latexes. In some embodiments, the organic polymer latexes useful in the present invention are water-borne organic polymer latexes. The term "water-borne organic polymer latex" means a dispersion of microparticles of the organic polymer described previously in a liquid substance, the liquid substance having a molecular formula of $H_2O$. Preferred water-borne organic polymer latexes are aqueous dispersions of microparticles of polypropylene, polybutylene, polystyrene, or poly(styrene-butadiene). In some embodiments, the organic polymer latexes useful in the present invention are latex powders. Preferably, the latex powders are redispersible in water. Preferred latex powders are homopolymer prepared from, and comprising residues of, vinyl acetate monomer or acrylic acid monomer or a copolymer that is a poly(vinyl acetate/vinyl versatate) copolymer, a poly(vinyl acetate/ethylene) copolymer, or a poly(styrene butadiene) copolymer. At least some latex powders are commercially available from, for example, Dow Wolff Cellulosics, a business unit of The Dow Chemical Company, Midland, Mich., USA. In some embodiments, the organic polymer latexes useful in the present invention are a combination comprising a water-borne organic polymer latex and an organic polymer latex powder.

Preferably, the organic polymer latex, whether water-borne or in powder form, is characterized by a glass transition temperature of less than 150 degrees Celsius (° C.). More preferably, the organic polymer latex is characterized by a glass transition temperature of less than 100° C., still more preferably less than 75° C., even more preferably less than 40° C.; and yet more preferably less than 30° C. Independently, the glass transition temperature is at least −40° C., preferably at least −20, more preferably at least −10° C., and even more preferably at least −5° C. In some embodiments, the invention modified geopolymer composition is a stabilized geopolymer-organic polymer latex composition, the stabilized geopolymer-organic polymer latex composition comprising, or is formed by combining, a first mixture of a hydrated polysialate and from 1.0 weight percent to 50 weight percent of an organic polymer latex, weight percent of the organic polymer latex being based on total weight of the first mixture and the organic polymer latex being characterized by a glass transition temperature of less than 150° C.

Preferably, the organic polymer latex is present in the first mixture comprising the stabilized geopolymer-organic polymer latex composition of the first embodiment in a concentration of 40 wt % or less, more preferably 35 wt % or less, and still more preferably 30 wt % or less, all based on total weight of the first mixture. While it is usually desirable to employ a minimum amount of the organic polymer latex that would be effective for providing a desired bonding strength for the adhering operative contact under the circumstances, in some embodiments, the concentration of the organic polymer latex in the first mixture comprising the stabilized geopolymer-organic polymer latex composition of the first embodiment preferably is at least 1 wt %, more preferably at least 2 wt %, still more preferably at least 4 wt %, and even more preferably at least 5 wt %, all based on total weight of the first mixture. An example of a preferred concentration range is from about 5 wt % to about 30 wt %, and more preferably from about 5 wt % to about 25 wt %, based on total weight of the first mixture. Concentrations of organic polymer latex that are provided later in the Examples are particularly useful.

The term "latex stabilizer" means a substance that inhibits coagulation or agglomeration of organic polymer particles that comprise the water-borne organic polymer latex. Latex stabilizers are known such as, for example, in U.S. Pat. No. 4,110,293. Examples of suitable latex stabilizers are proteins (e.g., gelatin and caseinate salts), carbohydrates (e.g., pectinates), glycols, and surfactants. Examples of suitable surfactants are anionic (i.e., sulfate, sulfonate, or carboxylate containing) surfactants such as perfluorooctanesulfonate; cationic (i.e., quaternary ammonium containing) surfactants such as cetyl trimethylammonium bromide; zwitterionic (i.e., amphoteric) surfactants such as coco ampho glycinate; and nonionic surfactants such as alkyl poly(ethylene oxide) and cetyl alcohol. Nonionic surfactants are preferred. Commercially available latexes typically contain latex stabilizers in amounts suitable for the present invention. In some embodiments, additional amounts of latex stabilizers or additional latex stabilizers can be added when preparing the stabilized geopolymer-organic polymer latex composition.

Preferably, the latex stabilizer functions in the embodiments of the invention stabilized geopolymer-organic polymer latex composition in which it is used as a means of stabilizing the water-borne organic polymer latex of the first mixture against coagulation or agglomeration for a time until the invention stabilized geopolymer-organic polymer latex composition is ready for being cured or cured and dried (e.g., hardening and having water removed therefrom). The latex stabilizer is present in the second mixture in a coagulating inhibiting amount, which is sufficient to inhibit coagulation of the water-borne organic polymer latex by 50% or more, preferably 75% or more, and more preferably 90% or more within 1 hour, preferably until completion of the contacting step, more preferably until start of the drying step, and still more preferably until start of the curing step of the second embodiment. Preferably, the coagulating inhibiting amount means the latex stabilizer is present in the second mixture comprising the water-borne organic polymer latex and latex stabilizer, the latex stabilizer being present in at least 1.0 wt %, more preferably at least 2.0 wt %, still more preferably at least 3.0 wt %, and even more preferably at least 4.0 wt %; and preferably 9.0 wt % or less, more preferably 8.0 wt % or less, still more preferably 7.0 wt % or less, and even more preferably 6.0 wt % or less, based on total weight of the second mixture.

The organic polymer substrates can be employed in the present invention in any form or shape. Examples of suitable forms of the organic polymer substrates are solids and foams. Examples of suitable shapes are films, sheets, fibers, particles, and woven or non-woven fabrics of thermoplastics. The organic polymer substrates can be prepared by any conventional method such as casting, molding, and extrusion. The term "organic polymer substrate" means a base material comprising the organic polymer described previously to which another material is contacted, adhered to, or both. A preferred organic polymer substrate is a polystyrene. The term "film" with respect to describing a substrate form of the organic polymer means a material of any desired length or width and having a thickness from 0.001 centimeter (cm) to 0.1 cm. The term "sheet" means a material of any desired length or width and having a thickness from 0.1 cm to 10 cm. Preferably, the substrate is characterized by surface porosity (e.g., as for foams). In some embodiments, the organic polymer substrate comprises a laminate of the organic polymer substrate and one or more layers of the same or different organic polymer substrate or any other suitable material such as, for example, wood, paper, metal, cloth, or oxides of one or more metal or metalloids, exemplified by clay, talc, silica, alumina, silicon nitride, or stone, as one or more layers of a multilayer structure or as a component of one or more layers provided that the organic polymer substrate has an exposed surface capable of being coated with the invention modified geopolymer composition.

Preferably, the geopolymer-coated organic polymer substrate comprises a geopolymer-coated article. That is, in some embodiments the invention is an article comprising the geopolymer-coated organic polymer substrate. In some embodiments the article comprises a geopolymer-coated automotive component, building component, outdoor article, or geopolymer-lined infrastructure component. More preferably the organic polymer substrate of the geopolymer-coated organic polymer substrate comprises polystyrene. Examples of such geopolymer-coated articles have been described previously herein. The geopolymer-coated articles can be coated in part or in whole. For example, the geopolymer-coated articles can be coated on interior surfaces, exterior surfaces, or a combination thereof. Preferably, the cured and dried modified geopolymer layers comprising the geopolymer-coated articles have not cracked, peeled, or bubbled.

The modified geopolymer compositions of the first embodiment can be contacted to the coating-ready surface, or the portion thereof, of the organic polymer substrate using any contacting methods as would be known in the art. Examples of suitable contacting methods are spreading (e.g., by pumping, mechanically pushing, or flowing), spraying, casting, molding, forming, and stamping. The contacting step provides the modified geopolymer precursor layer in physical contact with the coating-ready surface, or the portion thereof, of the organic polymer substrate. Preferably, the modified geopolymer precursor layer is characterized by a thickness, more preferably a uniform thickness. The modified geopolymer precursor layer is also characterized as having a drying-ready exposed surface from which at least 30 wt % of the water of the modified geopolymer precursor layer is removed in the drying step. Preferably, the drying-ready exposed surface of the modified geopolymer precursor layer is temporarily covered with a water barrier material (e.g., a polymer membrane or glass) during the curing step, and then uncovered before the drying step.

Drying (i.e., removing water from) the cured modified geopolymer precursor layer preferably comprises evaporation, stripping, freeze-drying, or a combination thereof. Drying can be done at ambient pressure (e.g., 101 kPa), elevated pressure (e.g., greater than 110 kPa, but preferably less than 120 kPa), or reduced pressure (e.g., less than 95 kPa). Drying can be done at any temperature suitable for removing some water from the modified geopolymer composition. Preferably, the drying temperature is 100 degrees Celsius (° C.) or less, more preferably less than 75° C., still more preferably less than 50° C., and even more preferably less than 40° C.; and independently preferably at least −10° C., more preferably at least −5, still more preferably at least 10° C., and even more preferably at least 15° C. In some embodiments, drying is done at ambient temperature (e.g., 10° C. to 40° C.) and comprises evaporation.

Preferably, removing water is characterizable as being at the drying temperature, the drying temperature preferably being greater than the glass transition temperature of the organic polymer latex in embodiments employing the organic polymer latex. The term "drying temperature" means a degree of hotness or coldness at which at least 30 wt % of water is removed from the cured modified geopolymer precursor layer. Preferably at least 50 wt %, more preferably at least 60 wt %, still more preferably at least 70 wt %, and even more preferably at least 75 wt % of water is removed from the cured modified geopolymer precursor layer during the drying step of the method of the second embodiment to give the dried and cured modified geopolymer layer. Where an organic polymer latex exhibits multiple glass transition temperatures, at least one and preferably the lowest one of the multiple glass transition temperatures is less than the drying temperature of the cured modified geopolymer precursor layer.

Curing the modified geopolymer precursor layer to give the cured modified geopolymer precursor layer can be done at any temperature suitable for curing the modified geopolymer composition. The term "curing temperature" means a degree of hotness or coldness at which the stabilized geopolymer-organic polymer latex composition or water concentration- and Si/Al molar ratio-modified geopolymer composition is hardened by allowing bonding thereof. Preferably curing is done at a curing temperature that is ambient temperature and, more preferably, a curing temperature of from 20° C. to 40° C. Curing and drying temperatures and pressures may be the same or different.

As mentioned previously, curing and drying the modified geopolymer precursor layer gives the cured and dried modified geopolymer layer in adhering operative contact with the coating-ready surface, or portion thereof, of the organic polymer substrate. The adhering operative contact meaning adhering to the coating-ready surface, or portion thereof, of the organic polymer substrate with a bond strength of 30.0 kilopascals (kPa) or greater, more preferably 49 kPa or greater, still more preferably 70 kPa or greater, and even more preferably 100 kPa or greater; and in some embodiments preferably about 150 kPa or lower, all when tested by the tensile pull test method described in the immediately following paragraph. Where the modified geopolymer precursor layer comprises the stabilized geopolymer-organic polymer latex composition of the first embodiment, preferably, the stabilized geopolymer-organic polymer latex composition is characterizable as being highly organic polymer-adherent capable. That is, the stabilized geopolymer-organic polymer latex composition, after being cured and dried in contact with a coating-ready surface of an organic polymer substrate, would produce a highly organic polymer-adherent cured and dried geopolymer-organic polymer latex layer on the coating-ready surface of the organic polymer substrate, the highly organic polymer-adherent cured and dried geopolymer-organic polymer latex layer being characterizable as adhering to the coating-ready surface, or portion thereof, of the organic polymer substrate with a bond strength of 50.0 kilopascals (kPa) or greater when tested by the tensile pull test method described in the immediately following paragraph.

Tensile Pull Test Method:

Step (a): Preparation of Cured and Dried 3-Layer Test Sample.

Obtain two pieces of an organic polymer substrate (e.g., polystyrene foam) sample, each sample piece having dimensions of 2 inches (5.1 centimeters (cm) by 2 inches (5.1 cm) square by 1 inch (2.54 cm) height. Separately coat a first 4 square inch (26 square cm) face of each one of the sample pieces with a test geopolymer composition, and hand press the resulting geopolymer layers together to give a three-layer laminate composite precursor sample comprising a bottom organic polymer substrate layer, a middle geopolymer layer, and a top organic polymer substrate layer. Wipe off any excess test geopolymer composition from edges of the precursor sample. Repeat four times to give a total of five precursor samples. Separately wrap the precursor samples in a plastic wrap (e.g., a polyvinylidene chloride wrap) or place the precursor samples in a partially filled water bath sealed with an air tight lid, and place the resulting plastic wrapped precursor samples or the precursor samples sealed in the partially filled water bath in a 45° C. oven for overnight (e.g., 12 hours to 24 hours) to cure the geopolymer (i.e., harden the geopolymer). (Alternatively, cure and dry precursor samples at ambient temperature (about 20° C.) in an open (i.e., uncovered) environment (i.e., without wrapping the precursor samples in the plastic wrap or placing the precursor samples in a sealed water bath) for a minimum of 2 days and, preferably for about 7 days, as may be desirable under particular circumstances.) Remove the resulting cured precursor samples from the oven, remove the plastic wrap or from the partially filled water bath, and allow the unwrapped cured precursor samples to dry at room temperature to a constant weight to give cured and dried 3-layer test samples.

Step (b): Preparation of 5-Layer Final Test Sample

For each of the cured and dried 3-layer test samples of step (a), apply a 2-part epoxy (3M Scotch-Weld epoxy adhesive 2216 B/A) to an outside (bottom) face of its bottom organic polymer substrate layer and an outside (top) face of its top organic polymer substrate layer. Contact each epoxy-containing outside face of the cured and dried test sample to a different one of two 2 inch (2.54 cm) by 2 inch (2.54 cm) steel plates. Allow the epoxy to dry for at least 24 hours to give a five-layer final test sample having opposing bottom and top steel plate layers.

Step (c): Tensile Pull Strength Testing.

Measure tensile pull strength of the five-layer final test samples of step (b) with an Instron (model 4204 or 5585) instrument. Use test parameters described in ASTM D 1623, which are particularly useful for tensile pull testing of polystyrene foam at a cross head speed of 0.05 inch per minute (0.13 cm per minute).

COMPARATIVE EXAMPLES
(NON-INVENTION)

Comparative Examples are provided herein as a contrast to certain embodiments of the present invention and are not meant to be construed as being either prior art or representative of non-invention examples.

Comparative Examples A1a to A1d

Preparing Unmodified Geopolymer Compositions (Lacking the Organic Polymer Latex and Latex Stabilizers) (Water Contents Based on Total Weight of Unmodified Geopolymer Composition)

A1a: Prepare a sodium silicate solution by combining ingredients 61.9 g water, 19.65 g solid sodium hydroxide, and 18.45 g of fumed silica. To a 10 g portion of the sodium silicate solution add 4 g of calcined kaolin clay, and mix the resulting mixture to give the geopolymer composition of Comparative Example A1a. Water content=47.3 wt % and Si/Al molar ratio of 1.85.

A1b: Repeat the general procedure of Comparative Example 1a except with the following ingredients and amounts: 56.26 g water, 21.47 g NaOH, 22.26 g fumed silica and 65.82 g calcined kaolin to give geopolymer composition of Comparative Example A1b (molar ratios: Si/Al=1.625; Na/Al=0.899) and water content=36.8 wt %.

A1c: Repeat the general procedure of Comparative Example 1a except with the following ingredients and amounts: 52.78 g water, 20.16 g NaOH, 27.06 fumed silica, and 55.56 g calcined kaolin to give geopolymer composition of Comparative Example A1e (molar ratios: Si/Al=1.9; Na/Al=1.0) and water content=36.8 wt %.

A1d: Repeat the general procedure of Comparative Example 1a except with the following ingredients and amounts: 52.31 g water, 23.41 g NaOH, 24.27 fumed silica, and 71.76 g calcined kaolin to give geopolymer composition of Comparative Example A1d (molar ratios: Si/Al=1.625; Na/Al=0.899) and water content=33.5 wt %.

Comparative Examples B1a to B1d

Five-layer Final Test Samples for Tensile Pull Test Method

B1a to B1d: Respectively using the preparation of steps (a) and (b) of the previously described the tensile pull test method and the unmodified geopolymer of one of Comparative Examples A1a to A1d instead of the test geopolymer composition, with each unmodified geopolymer prepare 5 five-layer final test samples of Comparative Examples B1a to B1d. Determine average adhesion strength of the five-layer final test samples according to step (c) of the previously described tensile pull test method. The tensile pull test results are recorded later in Table 1.

EXAMPLES OF THE PRESENT INVENTION

Non-limiting examples of the present invention are described below. In some embodiments, the present invention is as described in the examples.

Example A1

Stabilized Geopolymer-organic Polymer Latex Composition Containing 6.5 Wt % Water-borne Poly(styrene-butadiene) Latex Repeat the general procedure of Comparative Example A1a except with 52.0 g water, 19.65 g NaOH, 18.45 g silica, and 40 g calcined kaolin to give an unmodified geopolymer composition. To the unmodified geopolymer composition add a weighed amount (19.6 g) of Latex DL 460 (a polyglycol-36 (PG-36) stabilized water-borne poly(styrene-butadiene) latex commercially available from The Dow Chemical Company, Midland, Mich., USA, having a $T_g=8°$ C.) to give a modified geopolymer composition that is the stabilized geopolymer-organic polymer latex composition of Example A1 containing 6.5 wt % of water-borne poly(styrene-butadiene) latex and 44.2 wt % water content, both based on total weight of the stabilized geopolymer-organic polymer latex composition, and a Si/Al molar ratio of 1.85.

Examples A2 to A4

Stabilized Geopolymer-organic Polymer Latex Compositions Respectively Containing 16.7 Wt %, 20 Wt %, and 23.1 Wt % Water-borne Poly(styrene-butadiene) Latex a Water Content of 39.5 Wt %, 37.9 Wt %, and 36.4 Wt %, Respectively, and each having a Si/Al Molar Ratio of 1.85

Repeat the general procedure of Comparative Example A1a three times with: (i) 33.9 g water, 19.65 g NaOH, 18.45 g silica, 40 g calcined kaolin, (ii) 26.9 g water, 19.65 g NaOH, 18.45 g silica, 40 g calcined kaolin, or (iii) 19.9 g water, 19.65 g NaOH, 18.45 g silica, 40 g calcined kaolin to give respective unmodified geopolymer compositions. Repeat the general procedure of Example A1 with the respective unmodified geopolymer compositions and higher weighed amounts (56.0 g, 70.0 g, and 84.0 g, respectively) of Latex DL 460 (described above) to give instead the stabilized geopolymer-organic polymer latex composition of Examples A2 to A4 respectively containing 16.7 wt %, 20 wt %, and 23.1 wt % of water-borne poly(styrene-butadiene) latex and a water content of 39.5 wt %, 37.9 wt %, and 36.4 wt %, respectively, all based on total weight of the stabilized geopolymer-organic polymer latex compositions, and each having a Si/Al molar ratio of 1.85.

Examples A5a to A5c

Stabilized Geopolymer-organic Polymer Latex Compositions Respectively Containing 4.8 Wt %, 9.1 Wt %, and 17 Wt % Poly(vinyl acetate/ethylene) Latex Powder; having Water Content=36.8 Wt %; and Si/Al Molar Ratio=1.625. Preparation Described Later

Examples A6a to A6d

Stabilized Geopolymer-organic Polymer Latex Compositions Respectively Containing 4.8 Wt %, 9.1 Wt %, 23 Wt %, and 33 Wt % Poly(styrene-butadiene) Latex Powder; having Water Content=36.8 Wt %; and Si/Al Molar Ratio=1.625. Preparation Described Later

Examples A7a to A7d

Stabilized Geopolymer-organic Polymer Latex Compositions Respectively Containing 4.8 Wt %, 9.1 Wt %, 17 Wt %, and 23 wt % Polyacrylic Acid Latex Powder; having Water Content=36.8 Wt %; and Si/Al Molar Ratio=1.625. Preparation Described Later

Preparation of the Stabilized Geopolymer-Organic Polymer Latex Composition of Examples A5a to A7d Separately repeat the general procedure of Example A1 except (i) instead of the unmodified geopolymer composition of Comparative Example A1a use the unmodified geopolymer composition of Comparative Example A1b; and (ii) instead of Latex DL 460 use appropriate weighed amounts of either poly(vinyl acetate/ethylene) latex powder having a $T_g=3°$ C. (Examples A5a to A5c); or poly(styrene-butadiene) latex powder having a $T_g=8°$ C. (Examples A6a to A6d); or polyacrylic acid latex powder having a $T_g=10°$ C. (Examples A7a to A7d). These preparations give modified geopolymer compositions that are the stabilized geopolymer-organic polymer latex compositions respectively containing 4.8 wt %, 9.1 wt %, and 17 wt % poly(vinyl acetate/ethylene) latex powder of Examples A5a to A5c; stabilized geopolymer-organic polymer latex compositions respectively containing 4.8 wt %, 9.1 wt %, 23 wt %, and 33 wt % poly(styrene-butadiene) latex powder of Examples A6a to A6d; and stabilized geopolymer-organic polymer latex compositions respectively containing 4.8 wt %, 9.1 wt %, 17 wt %, and 23 wt % polyacrylic acid latex powder of Examples A7a to A7d, and all of the stabilized geopolymer-organic polymer latex composition of Examples A5a to A7d having water content=36.8 wt %; and Si/Al molar ratio=1.625.

Example A8

Water Concentration- and Si/Al Molar Ratio-modified Geopolymer Composition having Water Content=33.5 Wt % and a Si/Al Molar Ratio of 1.9

Prepare a water concentration- and Si/Al molar ratio-modified geopolymer composition having a reduced water content compared to water content of the unmodified geopolymer composition of Comparative Example A1c by employing a reduced water content sodium silicate solution having 48.8 g water, 21.9 g NaOH, 29.3 g silica, and combining the reduced water content sodium silicate solution with 60.2 g calcined kaolin to give a highly organic polymer-adherent capable, modified geopolymer composition that is the water concentration- and Si/Al molar ratio-modified geopolymer composition of Example A8 having a water content=33.5 wt % and a Si/Al molar ratio of 1.9.

Examples B1 to B4

Five-layer Final Test Samples Comprising a Stabilized Geopolymer-organic Polymer Latex Composition of any One of Examples A1 to A4, Respectively. Preparation and Testing Described Later

Examples B5a to B5c; B6a to B6d; and B7a to B7d

Five-layer Final Test Samples Comprising a Stabilized Geopolymer-organic Polymer Latex Composition of any One of Examples A5a to A5c; A6a to A6d; and A7a to A7d, Respectively. Preparation and Testing Described Later

Example B8

Five-layer Final Test Samples Comprising the Stabilized Geopolymer-organic Polymer Latex Composition of Example A8. Preparation and Testing Described Later

Preparation of the Five-Layer Final Test Samples of Examples B1 to B8

Repeat the procedure of steps (a) and (b) of the tensile pull test method four times for each of the stabilized geopolymer-organic polymer latex composition of Examples A1 to A4, B5a to B5c; B6a to B6d; and B7a to B7d, or B8, respectively, instead of the test geopolymer composition to give four five-layer final test samples for each of Examples B1 to B8. Determine average adhesion strengths according to the previously described step (c) of the tensile pull test method with each of the four five-layer final test samples. The type of modification of the modified geopolymer compositions, weight percents, and tensile pull test results are recorded below in Table 1.

TABLE 1

| | tensile pull test results | | | |
|---|---|---|---|---|
| Sample Number | Modification of geopolymer (water content (wt %) and Si/Al molar ratio (Si/Al)) | Weight Percent of latex (wt %) | Tensile Pull Strength (kPa) | 95% Confidence (kPa) |
| CE* B1a | None (water content = 47.3 wt %; Si/Al = 1.85) | 0 | 10 | N/a** |

TABLE 1-continued tensile pull test results

| Sample Number | Modification of geopolymer (water content (wt %) and Si/Al molar ratio (Si/Al)) | Weight Percent of latex (wt %) | Tensile Pull Strength (kPa) | 95% Confidence (kPa) |
|---|---|---|---|---|
| CE B1b | None (water content = 36.8 wt %; Si/Al = 1.6) | 0 | 14 | N/a |
| CE B1c | None (water content = 36.8 wt %; Si/Al = 1.9) | 0 | 19 | N/a |
| CE B1d | None (water content = 33.5 wt %; Si/Al = 1.6) | 0 | 8 | N/a |
| B1 | water-borne poly(styrene-butadiene) latex (water content = 44.2 wt %; Si/Al = 1.85) | 6.5 | 26 | ±2.9 |
| B2 | water-borne poly(styrene-butadiene) latex (water content = 39.5 wt %; Si/Al = 1.85) | 16.7 | 25 | ±2.8 |
| B3 | water-borne poly(styrene-butadiene) latex (water content = 37.9 wt %; Si/Al = 1.85) | 20.0 | 32 | N/a |
| B4 | water-borne poly(styrene-butadiene) latex (water content = 36.4 wt %; Si/Al = 1.85) | 23.15 | 26 | ±2.8 |
| B5a | poly(vinyl acetate/ethylene) latex powder (water content = 36.8 wt %; Si/Al = 1.625) | 4.8 | 9 | N/a |
| B5b | poly(vinyl acetate/ethylene) latex powder (water content = 36.8 wt %; Si/Al = 1.625) | 9.1 | 18 | N/a |
| B5c | poly(vinyl acetate/ethylene) latex powder (water content = 36.8 wt %; Si/Al = 1.625) | 17 | 8 | N/a |
| B6a | poly(styrene-butadiene) latex powder (water content = 36.8 wt %; Si/Al = 1.625) | 4.8 | 140 | N/a |
| B6b | poly(styrene-butadiene) latex powder (water content = 36.8 wt %; Si/Al = 1.625) | 9.1 | 68 | ±21 |
| B6c | poly(styrene-butadiene) latex powder (water content = 36.8 wt %; Si/Al = 1.625) | 23 | 58 | ±14 |
| B6d | poly(styrene-butadiene) latex powder (water content = 36.8 wt %; Si/Al = 1.625) | 33 | 49 | ±11 |
| B7a | polyacrylic acid latex powder (water content = 36.8 wt %; Si/Al = 1.625) | 4.8 | 43 | N/a |
| B7b | polyacrylic acid latex powder (water content = 36.8 wt %; Si/Al = 1.625) | 9.1 | 63 | ±24 |
| B7c | polyacrylic acid latex powder (water content = 36.8 wt %; Si/Al = 1.625) | 17 | 85.5 | ±24 |
| B7d | polyacrylic acid latex powder (water content = 36.8 wt %; Si/Al = 1.625) | 23 | 73.8 | ±30 |
| B8 | (reduced) water concentration- and Si/Al molar ratio-modified (water content = 33.5 wt %, Si/Al = 1.9) | 0 | 77 92 | N/a |

*CE means Comparative Example;
**N/a means not available.

As shown by the Examples, the invention stabilized geopolymer-organic polymer latex composition is capable of coating a coating-ready surface of an organic polymer substrate and, after curing and drying, forms an adherent, and in some cases a highly adherent, coating layer on the coating ready surface of the organic polymer substrate. In contrast, the compositions consisting of unmodified geopolymer, and thus lacking the organic polymer latex or not having a combination of reduced water content and increased Si/Al molar ratio, do not adhere, or adhere weakly to coating-ready surfaces of organic polymer substrates.

While the present invention has been described above according to its preferred embodiments, it can be modified within the spirit and scope of this disclosure. This application is therefore intended to cover any variations, uses, or adaptations of the present invention using the general principles disclosed herein. Further, the application is intended to cover such departures from the present disclosure as come within the known or customary practice in the art to which this present invention pertains and which fall within the limits of the following claims.

What is claimed is:

1. A modified geopolymer composition that comprises (i) a stabilized geopolymer-organic polymer latex composition comprising a mixture of a geopolymer and an organic polymer latex, wherein the geopolymer is an inorganic aluminosilicate composition having less than 36.0 weight percent of water, based on the total weight of water and geopolymer, and having a Si/Al molar ratio of from 1.70 to 3.0.

2. A modified geopolymer composition that is a stabilized geopolymer-organic polymer latex composition comprising a uniform mixture of a geopolymer and an organic polymer latex.

3. The modified geopolymer composition as in claim 2, the stabilized geopolymer-organic polymer latex composition comprising a first mixture of a hydrated polysialate and from 1.0 weight percent to 50 weight percent of an organic polymer latex, weight percent of the organic polymer latex being based on total weight of the first mixture.

4. The modified geopolymer composition as in claim 3, the hydrated polysialate being of empirical formula (G): $(M)_y[(-SiO_2)_z-AlO_2)]_x \cdot w\, H_2O$ (G), wherein each M independently is a cation of Group 1 of the Periodic Table of the Elements; x is an integer of 2 or higher and represents a number of polysialate repeat units; y is an integer selected so that a ratio of y to x is greater than zero (y/x >0); z is a rational or irrational number of from 1 to 35; and w is a rational or irrational number such that ratio of w to x represents a ratio of moles of water per polysialate repeat unit.

5. The modified geopolymer composition as in claim 3, wherein the organic polymer latex, which is used to form the first mixture, comprises a second mixture comprising a water-borne organic polymer latex and from 0.05 weight percent to 10 weight percent of a latex stabilizer, weight percent of the latex stabilizer being based on total weight of the second mixture.

6. The modified geopolymer composition as in claim 5, the water-borne organic polymer latex comprising a water-borne dispersion of polypropylene, polybutylene, polystyrene, or poly(styrene-butadiene).

7. The modified geopolymer composition as in claim 3, wherein the organic polymer latex, which is used to form the first mixture, comprises an organic polymer latex powder.

8. The modified geopolymer composition as in claim 7, the organic polymer latex powder comprising a homopolymer prepared from, and comprising residues of, acrylic acid monomer or a poly(styrene butadiene) copolymer.

9. The modified geopolymer composition as in claim 2, the stabilized geopolymer-organic polymer latex composition, after being cured and dried in contact with a coating-ready surface of an organic polymer substrate, has a bond strength of 50.0 kilopascals (kPa) or greater.

\* \* \* \* \*